United States Patent [19]
Fleischl et al.

[11] Patent Number: 6,038,552
[45] Date of Patent: Mar. 14, 2000

[54] METHOD AND APPARATUS TO PROCESS COMBINED CREDIT AND DEBIT CARD TRANSACTIONS

[75] Inventors: David Fleischl; Paul Hemminger; John Guido, all of New York, N.Y.

[73] Assignee: The Chase Manhattan Bank, New York, N.Y.

[21] Appl. No.: 08/988,169

[22] Filed: Dec. 10, 1997

[51] Int. Cl.[7] .......................... G06F 17/60; G06F 157/00
[52] U.S. Cl. .............................. 705/44; 705/41; 705/42; 705/43; 380/21; 380/25; 380/29; 235/379
[58] Field of Search ................... 705/21, 30, 44, 705/41, 17, 39; 235/379–381; 345/352; 340/825.33; 380/21, 25, 29

[56] References Cited

U.S. PATENT DOCUMENTS

| | | | |
|---|---|---|---|
| 4,319,336 | 3/1982 | Anderson et al. | 705/21 |
| 4,341,951 | 7/1982 | Benton | 705/41 |
| 4,594,663 | 6/1986 | Nagata et al. | 705/17 |
| 4,650,978 | 3/1987 | Hudson et al. | 235/380 |
| 4,727,243 | 2/1988 | Savar | 705/17 |
| 4,823,264 | 4/1989 | Deming | 705/39 |
| 4,839,504 | 6/1989 | Nakano | 235/379 |
| 4,851,650 | 7/1989 | Kitade | 705/44 |
| 5,036,461 | 7/1991 | Elliott et al. | 705/44 |
| 5,101,200 | 3/1992 | Swett | 340/937 |
| 5,285,382 | 2/1994 | Muehlberger et al. | 705/17 |
| 5,336,870 | 8/1994 | Hughes et al. | 235/379 |
| 5,461,217 | 10/1995 | Claus | 235/380 |
| 5,477,040 | 12/1995 | Lalonde | 235/380 |
| 5,530,232 | 6/1996 | Taylor | 235/380 |
| 5,534,683 | 7/1996 | Rankl et al. | 235/380 |
| 5,539,825 | 7/1996 | Akiyama et al. | 380/24 |
| 5,544,246 | 8/1996 | Mandelbaum et al. | 380/23 |
| 5,546,523 | 8/1996 | Gatto | 345/352 |
| 5,557,516 | 9/1996 | Hogan | 705/41 |
| 5,559,313 | 9/1996 | Claus et al. | 705/30 |
| 5,578,808 | 11/1996 | Taylor | 235/380 |
| 5,590,038 | 12/1996 | Pitroda | 705/41 |
| 5,591,949 | 1/1997 | Bernstein | 235/380 |
| 5,644,118 | 7/1997 | Hayashida | 235/379 |
| 5,687,323 | 11/1997 | Hodroff | 705/30 |
| 5,744,787 | 4/1998 | Teicher | 235/380 |
| 5,748,908 | 5/1998 | Yu | 705/44 |
| 5,870,473 | 2/1999 | Boesch et al. | 380/21 |
| 5,875,435 | 2/1999 | Brown | 705/30 |

FOREIGN PATENT DOCUMENTS

| | | | |
|---|---|---|---|
| 0605070 | 7/1994 | European Pat. Off. | |
| 0784282 | 7/1997 | European Pat. Off. | 705/43 |

OTHER PUBLICATIONS

Discover credit card policy, Web site http://www.privateissue.com, Discover Financial Service, a division of NOVUS Services, Inc., 1999.
BestBuy credit card monthly billing, Beneficial National Bank USA, Web site http://www.bestbuy.com, 1999.
Circuit City monthly billing, Circuit City stores, Inc., 1999.
Sraeel, "Card Wars: Pushing for Branded Debit", Bank Systems & Technology, May 1995.

(List continued on next page.)

*Primary Examiner*—James P. Trammell
*Assistant Examiner*—Cuong H. Nguyen
*Attorney, Agent, or Firm*—Ostrolenk, Faber, Gerb & Soffen, LLP

[57] ABSTRACT

A method and apparatus for executing a transaction using a credit card includes the steps of: maintaining a credit card account associated with the credit card, the credit card account having a credit limit and a transaction balance indicative of an aggregate of previously authorized transaction amounts in a predetermined period; maintaining a cash account associated with the credit card, the cash account having a cash balance; receiving a request for authorization for a new transaction amount against the credit card account in exchange for goods or services; and authorizing the requested transaction amount when the aggregate of the credit limit and cash balance less the transaction balance exceeds the requested transaction amount.

26 Claims, 5 Drawing Sheets

OTHER PUBLICATIONS

"Pilot expands to 110,000 cards" by Miller Freeman, Inc. (http://www.banktech.com/), 1997

"News + Trends: International verifact will bolster POS lines via acquisition" by Bank Systems & Technology, May 1995.

"Who will control the payments process" Miller Freeman, Inc., 1998.

Orenstein, "Chase, Citibank see pros & cons. in their mondex, Visa Cash pilots", Miller Freeman, Inc., 1998.

"New logica line will help funds transfer", by Bank Systems & Technology, May 1995.

"Client/server: Lowering the cost of wire transfer via call centers—customers wire cash from the phone" by Bank Systems & Technology, Jul. 1996.

"Capitalizing on smart card evolution" web site: http://www.banktech.com/ . . . , 1999.

Orenstein, "Canadian banks test cash card", Bank systems + Technology, Jul. 1997.

Day, "Panel decides smart cards too important to feud over" Miller Freeman, Inc., 1993.

Day, "Card Wars: tugging at card technology", Bank Systems & Technology, May 1995.

"Smart cards: Huntington bank to sell stored value cards", by Banking systems & technology, Jun. 1996.

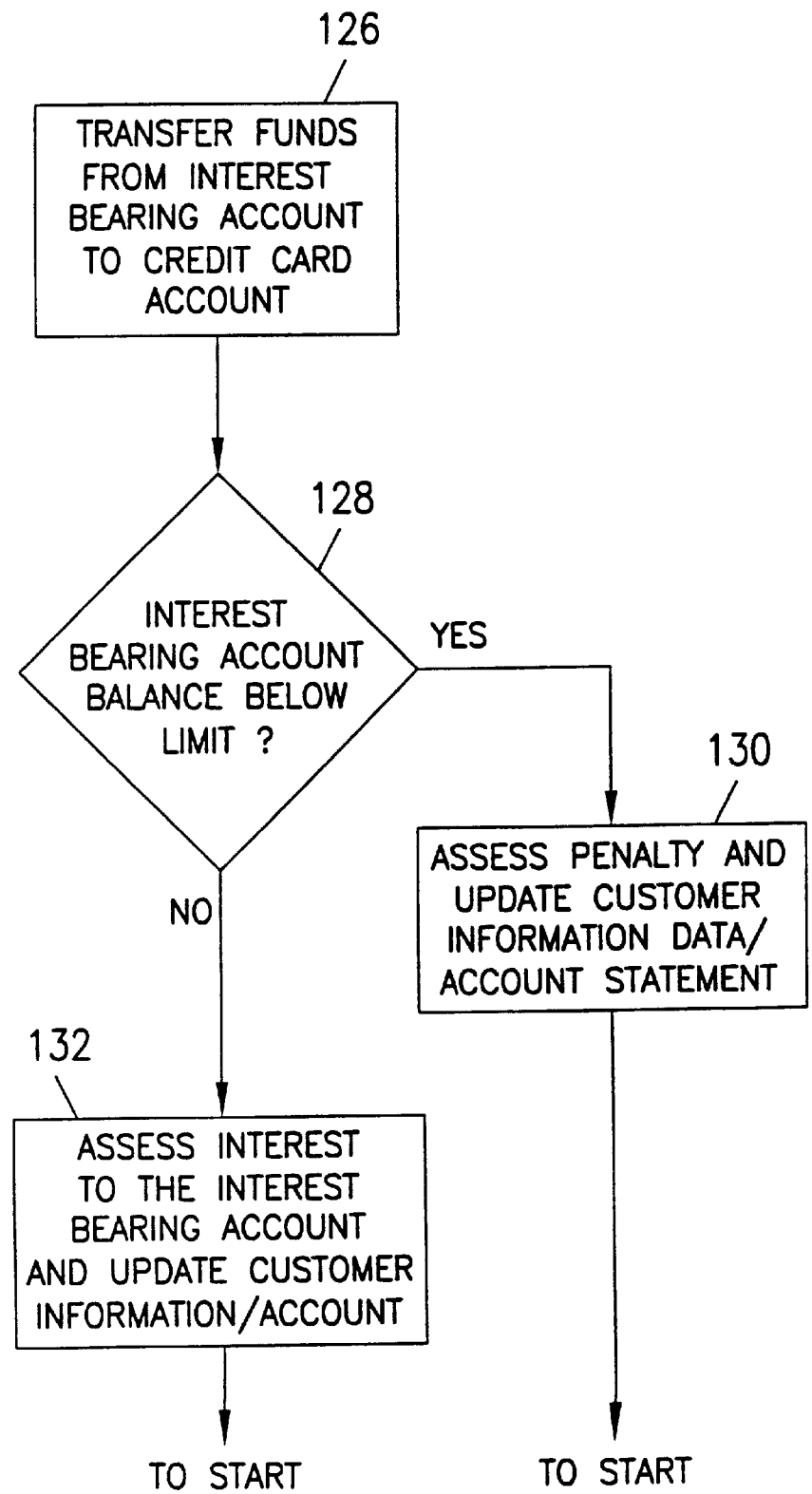

METHOD AND APPARATUS TO PROCESS COMBINED CREDIT AND DEBIT CARD TRANSACTIONS

BACKGROUND OF THE INVENTION

1. Field of the Invention

The present invention relates to a commercial transaction system and method capable of processing combined credit and debit card transactions and, more particularly, to a system and method for carrying out a combined credit and debit card transaction where, to the user and/or merchant, the combined credit and debit card appears to be a standard credit card.

2. Related Art

U.S. Pat. No. 5,557,516 to Hogan shows a commercial transaction system in which a system user employs a card device to interact with sales or transaction terminals to conduct cashless transactions. The system is designed for purchases of items or transactions of relatively small monetary value, where purchases are generally unattended by salespersons. The amount of the transaction is deducted from the balance on the card device. In accordance with that system, when the existing balance associated with the card does not cover the price of the transaction, the system provides an automatic renewal feature which automatically increases the balance of the card device by a predetermined amount. Each time the balance is increased by an automatic renewal, the card issuing bank bills the card user for increments of the predetermined amount.

The Hogan system is disadvantageous for several reasons. In particular, the system requires the user to limit his or her purchases to relatively small monetary transactions. Further, the card device may not be accepted by merchants who accept more well known card devices such as Visa or Mastercard. Still further, the user cannot make credit card purchases with the card device. Moreover, the user of the card device does not receive interest on the cash balance associated with the card device.

U.S. Pat. No. 5,544,246 to Mandelbaum discloses a smart card that allows different service providers to coexist on the smart card where the owner of the smart card may have limited access to some of the files created for or by each of the resident service providers. The Mandelbaum patent discloses that smart cards may authorize a debit or credit to an account associated with the smart card and that the smart card may carry pre-approved credit. In addition, the Mandelbaum patent discloses that the smart card has sufficient memory to permit, for example, Visa, American Express, and Mastercard to coexist on the smart card.

The smart card of the Mandelbaum system is disadvantageous because when the user charges an amount over a certain credit limit, the user has no other pool of funds from which to automatically draw and the transaction will be rejected. Further, the user receives no interest on any cash balance associated with the smart card.

U.S. Pat. No. 5,530,232 to Taylor discloses a multi-application data card which is capable of substituting for a plurality of existing single-application data cards. The multi-application data card can be a smart card comprising a memory formed with at least three memory banks or storage areas for storing and updating data relating respectively to at least one authorized holder of the card and at least two authorized applications of the card. The smart card disclosed in the Taylor patent is capable of use for credit transactions, debit transactions and non-financial transactions. A user inserts the smart card into a card reader having an input means which enables the user to select from several applications when performing a transaction.

The Taylor system is disadvantageous because when the user charges transactions over a certain limit, the user has no other pool of funds from which to automatically draw and the transaction will be rejected. Further, the smart card may not be accepted by merchants who prefer more well known credit cards such as Visa or Mastercard. Still further, the user receives no interest on the cash balance associated with the smart card, if any.

Accordingly, there is a need in the art for a multi-purpose credit card having the attributes of a standard credit card, a debit card, and an interest bearing cash account, where the credit card has a credit limit and a transaction balance (i.e., an aggregate of the authorized transactions in a given billing cycle) and the cash account has a cash balance.

With such a multi-purpose credit card, a user may employ the credit card in carrying out point-of-sale purchases and payments on the credit card may be automatically debited from the interest bearing account. The multi-purpose credit card may also be used as an automated teller machine (ATM) card such that the user may withdraw cash from the interest bearing account.

Further, there is a need in the art for a system where, when the user requests a transactional amount on the credit card which exceeds the credit limit of the credit card, a bank system authorizes the transaction based upon the aggregate of the credit limit and the cash balance less the transaction balance. Thus, a transaction may be authorized even though the credit limit associated with the credit card is exceeded. At the end of the billing cycle, funds from the interest bearing cash account are transferred to the credit card account to cover an amount due on the credit card.

SUMMARY OF THE INVENTION

To overcome the drawbacks of the prior art commercial transaction systems, the present invention employs a method for executing a transaction using a credit card including the steps of: maintaining a credit card account associated with the credit card, the credit card account having a credit limit and a transaction balance indicative of an aggregate of previously authorized transaction amounts in a predetermined period; maintaining a cash account associated with the credit card, the cash account having a cash balance; receiving a request for authorization for a new transaction amount against the credit card account in exchange for goods or services; and authorizing the requested transaction amount when the aggregate of the credit limit and cash balance less the transaction balance exceeds the requested transaction amount.

Another aspect of the invention is directed to an apparatus for executing a transaction using a credit card, where the apparatus includes: a credit card account associated with the credit card, the credit card account having a credit limit and a transaction balance indicative of an aggregate of previously authorized transaction amounts in a predetermined period; a cash account associated with the credit card, the cash account having a cash balance; and a transaction processing unit coupled to the cash account and the credit account, the transaction processing unit being adapted to (i) receive a request for authorization for a new transaction amount against the credit card account in exchange for goods or services; and (ii) authorize the requested transaction amount when the aggregate of the credit limit and cash balance less the transaction balance exceeds the requested transaction amount.

Other features and advantages of the present invention will become apparent from the following description of the invention which refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangement and instrumentality shown.

FIGS. 2A through 2D are process flow diagrams illustrating the control and process flow for the system of FIG. 1.

DETAILED DESCRIPTION OF THE INVENTION

Figure 1:
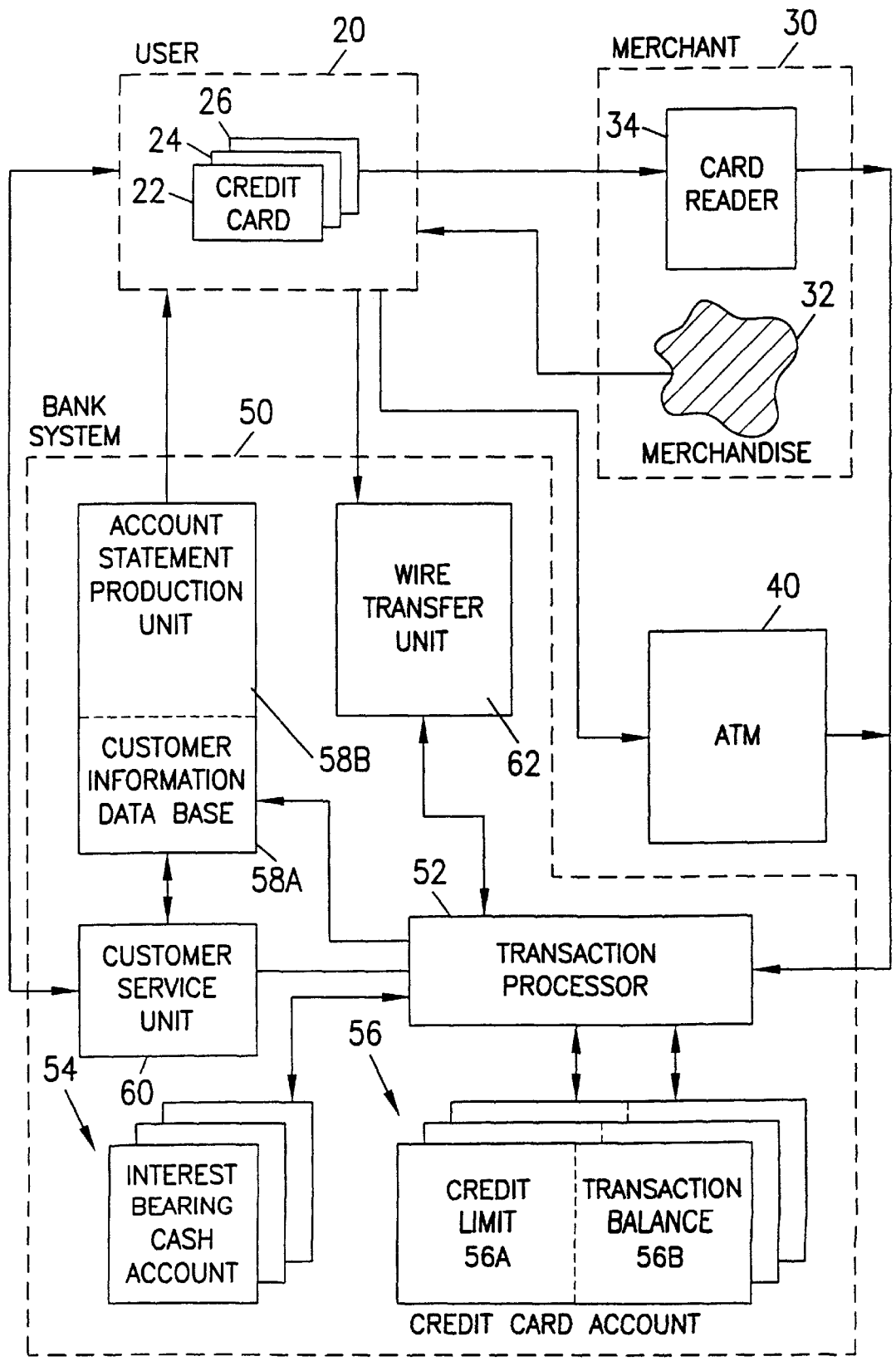
FIG. 1 is a block diagram showing a system for carrying out a commercial transaction using a combined credit and debit card in accordance with the invention.

Referring now to the drawings wherein like numerals indicate like elements, there is shown in FIG. 1 a block diagram of a system for carrying out a commercial transaction using a combined credit and debit card.

The system 10 includes a user 20 carrying one or more credit cards 22–26, a merchant 30 capable of receiving the credit card 22 in exchange for merchandise 32, and a banking system 50 for authorizing a commercial transaction between the user 20 and the merchant 30.

The system 10 may also include an ATM 40 for permitting the user 20 to access cash drawn against an account associated with the credit card 22.

From the viewpoints of the user 20 and the merchant 30, the credit card 22 appears to be a standard credit card. Therefore, as is known, a user 20 desirous of making a point-of-sale purchase of merchandise 32 from the merchant 30 presents the credit card 22 to the merchant 30. The merchant 30 then employs a card reader 34 to access the bank system 50 to obtain authorization to carry out the point-of-sale transaction with the user 20.

It is preferred that the credit card 22 be associated with a well known credit card organization, for example, Visa and/or Mastercard so that the goodwill and widespread infrastructure associated with those organizations permit the user 20 to employ the credit card 22 in carrying out commercial transactions with many merchants 30.

The card reader 34 employed by the merchant 30 is operatively coupled to the bank system 50, for example, via a dedicated communication line. The bank system 50 includes a transaction processor 52, an interest bearing cash account 54 associated with a particular credit card 22–26 (for example, credit card 22), a credit card account 56 also associated with the particular credit card 22, a customer information data base 58A, a statement production unit 58B, and a customer service unit 60.

The transaction processor 52 is operatively coupled to the merchant card reader 34 in a way which is well known in the art such that a request to make a commercial transaction in a monetary amount for the benefit of the merchant 30 may be received by the bank system 50. The transaction processor 52 is operatively coupled to the interest bearing cash account 54 in such a way that the transaction processor 52 may obtain the cash balance of the account 54 or debit or credit the account 54 as is required to carry out the invention.

The transaction processor 52 is also operatively coupled to the credit card account 56 in such a way that a transaction balance 56B of the credit card account 56 may be increased or decreased as required. The transaction balance 56B corresponds to an aggregate of the previously authorized transactions in a given billing cycle (for example, a one month cycle). The transaction processor 52 also has access to the credit limit 56A associated with the particular credit card 22 held by the user 20.

The transaction processor 52 of the bank system 50 is operatively coupled to the customer information data base 58A such that customer information, for example, customer address, credit history, or the like may be accessed and utilized in preparing an account statement by the statement production unit 58B.

The bank 50 is also coupled to (or includes) a wire transfer unit 62 such that the user 20 may cause a wire transfer of funds from one account to other account to occur.

Figure 2A:
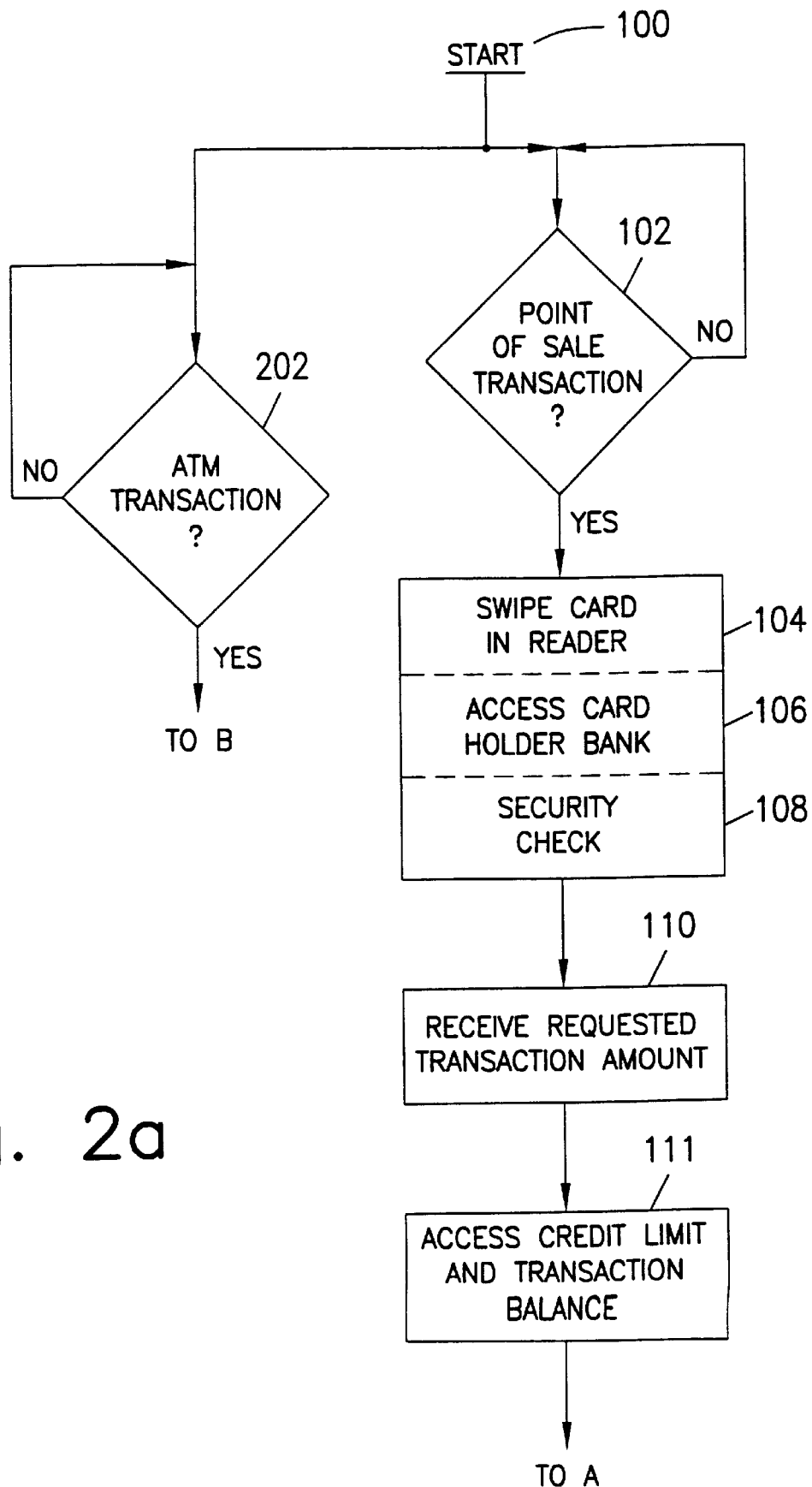

Reference is now made to FIG. 2A which shows the control and process flow of the system 10. At step 100, the user 20 presents the credit card 22 to the merchant 30 and, at step 102, the process flow will branch in the affirmative when a point-of-sale transaction is requested.

At step 104, the merchant 30 swipes the credit card 22 through the card reader 34 (or otherwise reads information from the card 22). The card reader 34 causes a communication link to obtain between the card reader 34 and the transaction processor 52 of the bank system 50 at step 106. At step 108, the transaction processor 52 receives information regarding the credit card 22 and the user 20 from the card reader 34 and verifies that the card 22 is a valid instrument (i.e., performs a security check). The security check may be accomplished using any of the known techniques.

At step 110, the transaction processor 52 receives the requested transaction amount from the card reader 34 and stores that amount in a memory (not shown) of the processor 52. The transaction processor 52 also obtains a value corresponding with the credit limit 56A and a value corresponding to the transaction balance 56B for the credit card account 56 associated with the particular credit card 22 and stores those values in the memory (step 111).

Figure 2B:
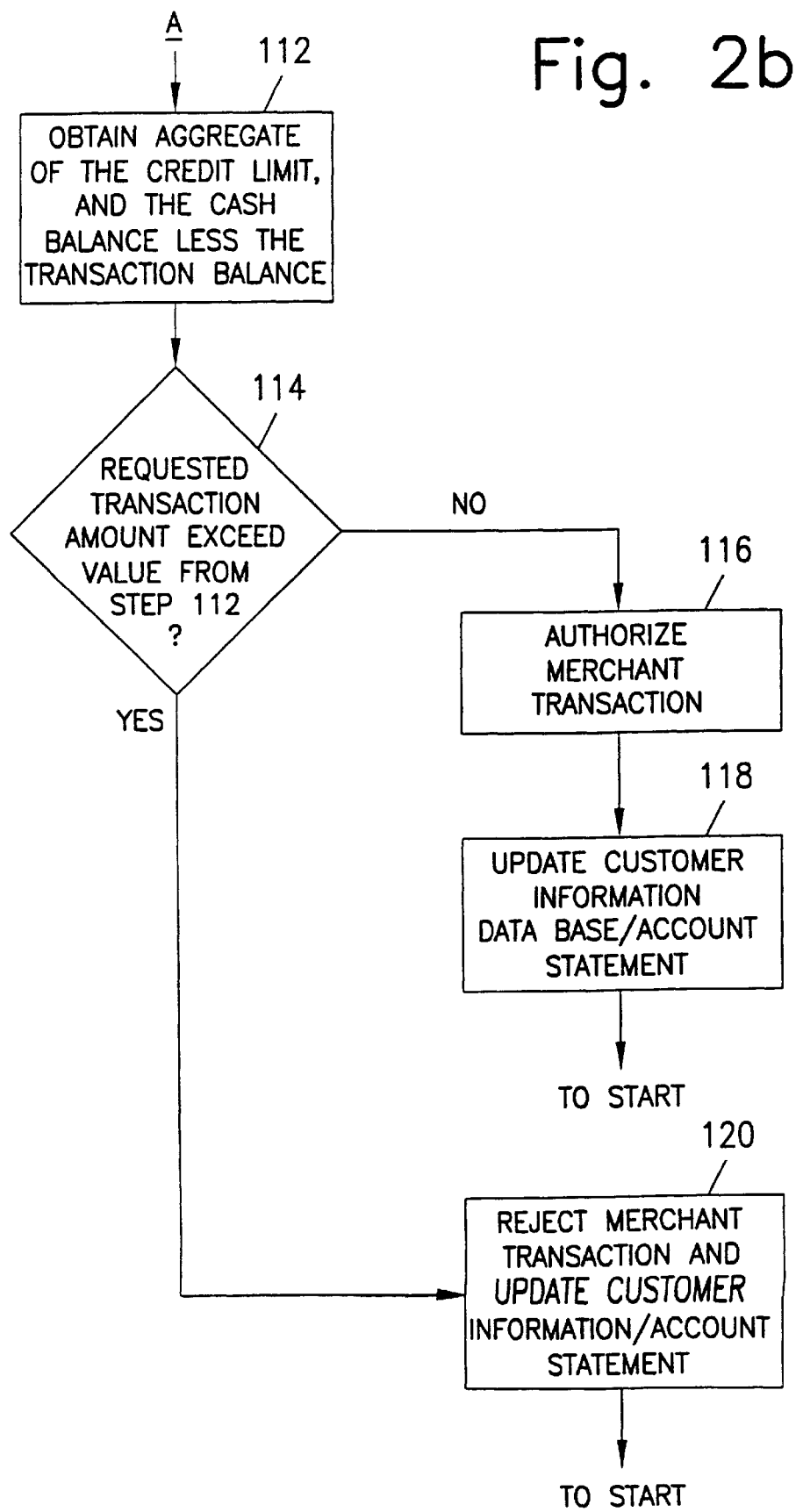

Referring to FIG. 2B, at step 112, the transaction processor 52 calculates the aggregate of the credit limit 56A and the cash balance of the interest bearing cash account 54 less the transaction balance 56B. At step 114, the transaction processor 52 determines whether the requested transaction amount would exceed the amount calculated at step 112.

When the aggregate of the credit limit 56A and the cash balance less the transaction balance 56B exceeds the requested transaction amount, then the process flow branches to step 116 where the merchant transaction is authorized.

At step 118, the transaction processor 52 updates the transaction balance 56B and updates the customer information data base 58A to reflect that a credit card transaction in the amount of the requested transaction amount has taken place. The customer information is used to prepare an account statement for presentation to the user 20. The process flow then loops back to step 100 to await another transaction.

When the requested transaction amount exceeds the aggregate of the credit limit 56A and the cash balance less the transaction balance 56B, then the process flow branches to step 120 where the transaction amount is rejected. The transaction processor 52 also updates the customer information data base 58A to reflect the rejected transaction and process flow loops back to step 100.

It is preferred that the credit card account 56 be reconciled (e.g., balanced, partially paid, or the like) at the end of a billing period (or within a reasonable period thereafter) and preferably on a monthly basis. The process steps of FIG. 2C are preferably carried out at the end of a billing cycle. At step 126, the transaction processor 52 debits the interest bearing account 54 and credits the credit card account 56 by an amount which reduces the transaction balance 56B to a value which does not exceed the credit limit 56A and insures that any other amounts due on the credit card 22 are paid.

At step 128, the transaction processor 52 determines whether the cash balance of the interest bearing account 54 after crediting the credit card account 56 has fallen below a predetermined limit. The predetermined limit is preferably above zero, but may be any other specified amount.

When the balance of the interest bearing account 54 has fallen below the predetermined limit, the transaction processor 52 assesses a monetary penalty against, for example, the interest bearing account 54 for failing to maintain a minimum cash balance (step 130). The processor 52 also updates the customer information data base 58A to reflect the assessment. The updated customer information is used by the statement production unit 58B to prepare an account statement for presentation to the user 20.

When the balance of the interest bearing account 54 has not fallen below the predetermined limit, the transaction processor 52 assesses (i.e., pays) interest to the interest bearing account 54 (step 132). Preferably, the interest is calculated on the average daily cash balance in the interest bearing account 54 including outstanding interest and fees. Unlike the prior art, the user 20 advantageously receives interest on the cash balance in his or her interest bearing account 54 (i.e., the debit account). After paying interest to the interest bearing cash account 54, the transaction processor 52 updates the customer information data base 58A to reflect the interest payment.

Figure 2D:
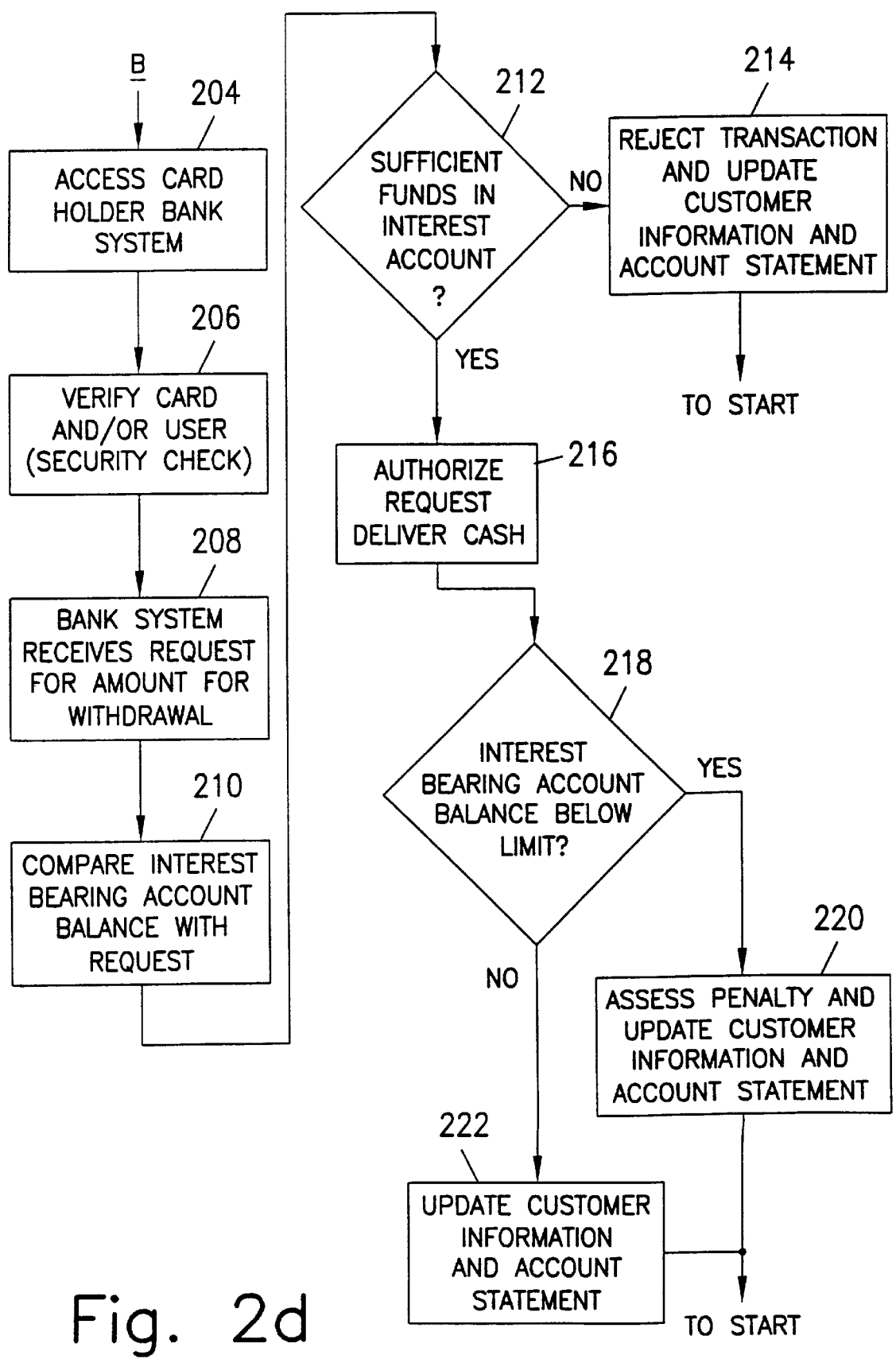

Reference is again made to FIG. 2A where, at step 202, the user 20 desires to make a cash withdrawal from the ATM 40. In such a case, the process flow branches to step 204 (FIG. 2D) where a card reader (not shown) of the ATM 40 establishes a communication link with the transaction processor 52 of the bank system 50. At step 206, the transaction processor 52 receives information from the card reader of the ATM 40 which is sufficient to verify that the credit card 22 presented to the ATM 40 is valid (i.e., a security check is performed).

The transaction processor 52 receives a requested cash withdrawal amount from the ATM 40 and stores that value in the memory at step 208. At step 210, the transaction processor 52 accesses the interest bearing cash account 54 to obtain the cash balance thereof and stores that value in the memory. At step 212, the transaction processor 52 compares the value of the cash balance available in the interest bearing account 54 with the requested cash withdrawal amount to determine whether there are sufficient funds available in the account 54 to cover the request. When there are not sufficient funds in the account 54, the process flow branches to step 214 where the request is rejected and the transaction processor 52 updates the customer information data base 58A to reflect the rejection.

When the available funds in the interest bearing account 54 are sufficient to cover the request, then the process flow branches to step 216 where the request is authorized.

At step 218, the transaction processor 52 determines whether the balance of funds available from the interest bearing account 54, after the account has been debited by the requested amount, are above the predetermined limit. When the balance available in the interest bearing account 54 has fallen below the predetermined limit, then the process flow branches to step 220 where the transaction processor 52 assesses a penalty to the user's account and updates the customer information data base 58A accordingly.

When the available balance in the interest bearing account 54, however, has not fallen below the predetermined limit at step 218, then the process flow moves to step 222 where the transaction processor 52 updates the available balance in the interest bearing account 54 and also updates the customer information data base 58A to reflect that a withdrawal has been made. The process flow then loops back to step 100.

Referring again to FIG. 1, when a transaction has been requested of the transaction processor 52, the results of the request are stored in the customer information data base 58A such that the statement production unit 58B may produce an account statement for the user 20. The report is preferably segregated into cash transactions and credit card transactions where the balances of the interest bearing account 54 and the credit card account 56 are presented. Any penalties for permitting the balance of the interest bearing account 54 to fall below the predetermined limit are also presented in the account statement.

Some users 20, for example, those maintaining a balance in the interest bearing account 54 above a first predetermined limit, may obtain certain services via the customer service unit 60. Such services may include live operator service for certain periods during the day, for example, 17 hours per day. The live operator service is preferably available seven days per week but may be available on a more limited basis.

The customer service unit 60 may be designed such that other users 20 having, for example, a balance in the interest bearing account 54 above a second predetermined limit have access to certain premium services. These premium services preferably include access to a personal banker who services the user's account, resolves problems, manages customer communications and facilitates business between the user 20 and the owner of the bank system 50.

The present invention contemplates that a user 20 who holds the credit card 22 and maintains a minimum balance in the interest bearing account 54 receives such additional services as travel and accident insurance, extended warranties on purchases, emergency travel assistance, special life, health, and auto insurance policies, rental car insurance, concierge services, usage awards, access to airport lounges, shopping incentives and the like.

The bank system 50 also provides the user 20 with the ability to transfer funds from or to the interest bearing account 54 via wire transfer unit 62 as is apparent to one skilled in the art.

Although the present invention has been described in relationship to particular embodiments thereof, many other variations and modifications and other uses will become apparent to those skilled in the art. It is preferred, therefore, that the present invention be limited not by this specific disclosure herein, but only by the appended claims.

What is claimed is:

1. A method for executing a transaction using a credit card, comprising the steps of:

maintaining a credit card account associated with the credit card, the credit card account having a credit limit and the credit card having a transaction balance indicative of an aggregate of previously authorized transaction amounts in a predetermined period;

maintaining a cash account associated with the credit card, the cash account having a cash balance;

receiving a request for authorization for a new transaction amount against the credit card account in exchange for goods or services; and authorizing the requested transaction amount when the aggregate of the credit limit and cash balance less the transaction balance exceeds the requested transaction amount.

2. The method of claim 1, further comprising the step of automatically transferring cash from the cash account to the credit card account in an amount which is sufficient to reduce the transaction balance below the credit limit.

3. The method of claim 2, wherein the step of automatically transferring cash from the cash account to the credit card account is performed at the end of a billing cycle.

4. The method of claim 3, wherein the billing cycle is about a one month cycle.

5. The method of claim 1, comprising the steps of:

receiving a request for authorization for an amount of cash issued against the credit card; and authorizing the amount of cash and transferring the amount of cash from the cash account to satisfy the request.

6. The method of claim 5, comprising the step of assessing a penalty when the cash balance in the cash account falls below a predetermined limit.

7. The method of claim 6, wherein the step of assessing a penalty is performed at the end of a billing cycle.

8. The method of claim 7, wherein the billing cycle is about a one month cycle.

9. The method of claim 1, comprising the step of paying interest on the cash balance in the cash account.

10. The method of claim 9, wherein the step of paying interest includes calculating the interest on an average daily balance of cash in the cash account.

11. The method of claim 9, wherein the step of paying interest is performed at the end of a billing cycle.

12. The method of claim 11, wherein the billing cycle is about a one month cycle.

13. The method of claim 2, comprising the step of assessing a penalty when the cash balance in the cash account falls below a predetermined limit.

14. The method of claim 13, wherein the step of assessing a penalty is performed at the end of a billing cycle.

15. The method of claim 14, wherein the billing cycle is about a one month cycle.

16. The method of claim 1, comprising the step of rejecting the requested transaction amount when it exceeds the aggregate of the credit limit and cash balance less the transaction balance by a predetermined amount.

17. The method of claim 16, wherein the predetermined amount is any amount greater than zero.

18. An apparatus for executing a transaction using a credit card, comprising:

a credit card account associated with the credit card, the credit card account having a credit limit and a transaction balance indicative of an aggregate of previously authorized transaction amounts in a predetermined period;

a cash account associated with the credit card, the cash account having a cash balance; and a transaction processing unit coupled to the cash account and the credit account, the transaction processing unit being adapted to (i) receive a request for authorization for a new transaction amount against the credit card account in exchange for goods or services; and (ii) authorize the requested transaction amount when the aggregate of the credit limit and cash balance less the transaction balance exceeds the requested transaction amount.

19. The apparatus of claim 18, wherein the transaction processing unit is further adapted to automatically transfer cash from the cash account to the credit card account in an amount which is sufficient to reduce the transaction balance below the credit limit.

20. The apparatus of claim 18, wherein the processing unit is further adapted to (iii) receive a request for authorization for an amount of cash issued against the credit card; and (iv) authorize the amount of cash and transfer the amount of cash from the cash account to satisfy the request.

21. The apparatus of claim 20, wherein the processing unit is further adapted to assess a penalty when the cash balance in the cash account falls below a predetermined limit.

22. The apparatus of claim 18, wherein the processing unit is further adapted to pay interest on the cash balance in the cash account.

23. The apparatus of claim 22, wherein the processing unit is adapted to pay the interest by calculating the interest on an average daily balance of cash in the cash account.

24. The apparatus of claim 18, wherein the processing unit is further adapted to assess a penalty when the cash balance in the cash account falls below a predetermined limit.

25. The apparatus of claim 18, wherein the processing unit is further adapted to reject the requested transaction amount when it exceeds the aggregate of the credit limit and cash balance less the transaction balance by a predetermined amount.

26. The apparatus of claim 25, wherein the predetermined amount is any amount greater than zero.

* * * * *